United States Patent [19]

Ticer et al.

[11] Patent Number: 5,261,294

[45] Date of Patent: Nov. 16, 1993

[54] ADJUSTABLE ELLIPTICAL CRANK MECHANISM

[75] Inventors: Joseph D. Ticer, Beaverton, Oreg.; Michael K. Farney, Irving, Tex.

[73] Assignee: A.E.C. Pre-Patent Partnership, Irving, Tex.

[21] Appl. No.: 415,975

[22] Filed: Oct. 2, 1989

[51] Int. Cl.⁵ .............................................. B62M 3/02
[52] U.S. Cl. ................................... 74/594.1; 74/594.3; 280/260
[58] Field of Search ........................... 74/594.1–594.3, 74/572, 665 GA, 421 R; 280/259, 260, 261

[56] References Cited

U.S. PATENT DOCUMENTS

| | | | |
|---|---|---|---|
| 602,536 | 4/1898 | Bassett | 280/260 |
| 602,842 | 6/1902 | Williams | 74/594.1 |
| 642,410 | 1/1900 | Young . | |
| 3,789,696 | 2/1974 | Beam, III | 74/594.1 |
| 3,865,366 | 2/1975 | Stantial | 272/73 |
| 3,888,136 | 6/1975 | Lapeyre | 74/594.1 |
| 4,029,334 | 6/1977 | Trammell, Jr. | 74/594.2 |
| 4,159,652 | 7/1979 | Trammel, Jr. | 74/117 |
| 4,173,154 | 11/1979 | Sawmiller et al. | 74/217 |
| 4,193,324 | 3/1980 | Marc | 74/750 |
| 4,249,424 | 2/1981 | Glazier | 74/25 |
| 4,706,516 | 11/1987 | Xi | 74/594.1 |
| 4,721,015 | 1/1988 | Hartmann | 280/260 |
| 4,809,970 | 3/1989 | Beistegni | 74/594.1 |
| 4,882,945 | 11/1989 | Trevizo | 74/594.3 |

FOREIGN PATENT DOCUMENTS

| | | | |
|---|---|---|---|
| 0163495 | 7/1949 | Fed. Rep. of Germany | 74/594.3 |
| 0443927 | 12/1949 | Italy | 74/594.3 |

*Primary Examiner*—Carl D. Friedman
*Assistant Examiner*—Winnie Yip
*Attorney, Agent, or Firm*—J. Mark Holland; Thomas P. Mahoney

[57] ABSTRACT

A crank mechanism is provided which has a first driven member constituted by a first shaft, and a second driven member constituted by a sleeve member-disposed around said first shaft. The sleeve member is retained in support means such that the sleeve member and the first shaft can rotate relatively to one another. A rotating arm is connected to the sleeve member, and attachment means is slidable along said rotating arm. First linkage means is provided between said attachment means and said first shaft, and second linkage means is provided between said sleeve member and said first shaft, whereby said attachment means can selectively describe any of a range of circular or elliptical paths. In the preferred embodiment, the linkage means are adjustable and include a counter-rotating arm associated with said first shaft, and a second shaft and a third shaft and gears associated therewith and with said first shaft, which gears transmit rotational movement from said first shaft to said sleeve member. The invention is easily adaptable for physical therapy applications and for use as a drive mechanism for a bicycle.

26 Claims, 6 Drawing Sheets

ADJUSTABLE ELLIPTICAL CRANK MECHANISM

BACKGROUND OF THE INVENTION

This invention relates to a crank mechanism which is especially useful in physical rehabilitation programs and in bicycle pedaling mechanisms. The mechanism of the invention provides an easily adjustable circular and/or elliptical path of travel for the handles or pedals associated with such mechanisms.

Although the invention is adaptable to a wide variety of crank-type applications, it is particularly useful in physical therapy applications, in which it is frequently necessary to have a patient's limbs repeatedly trace circular or elliptical patterns or to simulate motions and exercises such as rowing.

The range of physical therapies which can be achieved with the invention is substantial. Some patients require treatment involving a degree of positive resistance on a crank mechanism; for these patients, proper therapy includes the patient forcing the crank to move. For other patients it is a great achievement to merely have their limbs pulled through a certain movement pattern; the crank has to provide the motive force for these patients' therapy. Depending upon the particular needs of the patient, appropriate therapy may include treatment of both arms or both legs, either simultaneously or individually, as well as treatment of only one arm or one leg.

Furthermore, patients' needs vary widely with respect to the height and orientation at which the crank-related movement is most beneficial. For optimum flexibility and usefulness, therefore, a crank mechanism for physical therapy must be readily portable and mountable or otherwise adjustable into a range of positions and locations.

Moreover, the crank mechanism of the present invention adds a further dimension to physical therapy by providing the ability to adjust the pattern of movement incrementally, such as changing from a relatively flat elliptical pattern gradually to a circular pattern or vice versa, as the patient improves. Except for the mechanism of the invention, the inventors are not aware of any equipment available for use in physical therapy which can achieve the adjustable elliptical patterns of the present invention.

Obviously, a crank mechanism which can meet this broad range of needs is extremely valuable in the field of physical therapy, in that it will reduce the cost of buying, storing, and maintaining many pieces of equipment to achieve the same ends. Ideally, and perhaps most importantly, such a device allows a therapist to customize the treatment to the particular patients' needs.

As indicated above, the invention is also directly applicable to bicycle pedalling mechanisms. For many years, attempts have been made to modify the standard bicycle pedalling mechanism to improve its energy efficiency and its ease of use, and to reduce the perceived boredom of repeatedly moving one's legs and feet through a circular pedal path. Certain devices, such as U.S. Pat. Nos. 4,706,516 to La Xi and U.S. Pat. No. 4,159,652 to Trammell, Jr., have retained the circular pedal path and focused solely on improving the energy efficiency. Other devices have used relatively fixed linkage and/or gear combinations to achieve a pedal path which is oval (U.S. Pat. No. 4,173,154 to Sawmiller), elliptical (U.S. Pat. No. 4,193,324 to Marc), spiral, or cardioidal (U.S. Pat. No. 3,865,366 to Stantial).

Although certain of the aforementioned prior art devices have achieved non-circular pedal motion, the particular motion of each is relatively fixed by the structure and dimensions of the particular components used therein. These prior art devices do not exhibit the ease and degree of adjustability achieved by the present invention, and certainly do not provide the flexibility of application desirable in an exercise rehabilitation mechanism appropriate for physical therapy.

OBJECTS AND ADVANTAGES OF THE INVENTION

It is, therefore, an object of our invention to provide a crank mechanism which can be easily adjusted to result in a wide variety of handle or pedal paths, including a range of circular and elliptical paths.

It should be understood that, while the application and utilization of the crank mechanism is described herein in an embodiment adaptable for use in physical therapy and rehabilitation applications, the invention is directly adaptable for applications in bicycle-pedalling-type mechanisms and may be utilized in many other applications, including use in engine and motor mechanisms.

A further object of our invention is the provision of a crank mechanism which is relatively compact and transportable, and thus particularly useful in physical therapy applications.

Another object of our invention is the provision of a crank mechanism which can be used to simulate rowing and other physical motions.

An additional object of our invention is to provide a crank mechanism which can be driven by a motor or other external energy source, such that a patient can passively have his or her limbs moved through a selected motion pattern. Alternatively, the invention is capable of providing positive resistance to the patient's movements.

Yet another object of our invention is the provision of a crank mechanism for physical therapy which can exercise a patient's limbs in phase with each other, 180 degrees out of phase with each other, or any range therebetween.

Another object of our invention is to provide an exercise crank mechanism which can be easily adapted to exercise one or two of a patient's limbs at a time. It will be obvious to those skilled in the art that, although the invention is generally discussed herein as having two rotating arms and pedals or handles associated therewith, certain principles of the invention may be practiced with only one such rotating arm and associated pedal or handle.

An additional object of our invention is the provision of a crank mechanism in which two associated rotating pedals and/or handles may be adjusted to travel in independently-shaped elliptical and/or circular paths.

Other objects and advantages of the invention will be apparent from the following specification and the accompanying drawings.

DESCRIPTION OF PREFERRED EMBODIMENTS OF THE INVENTION

Figure 1:
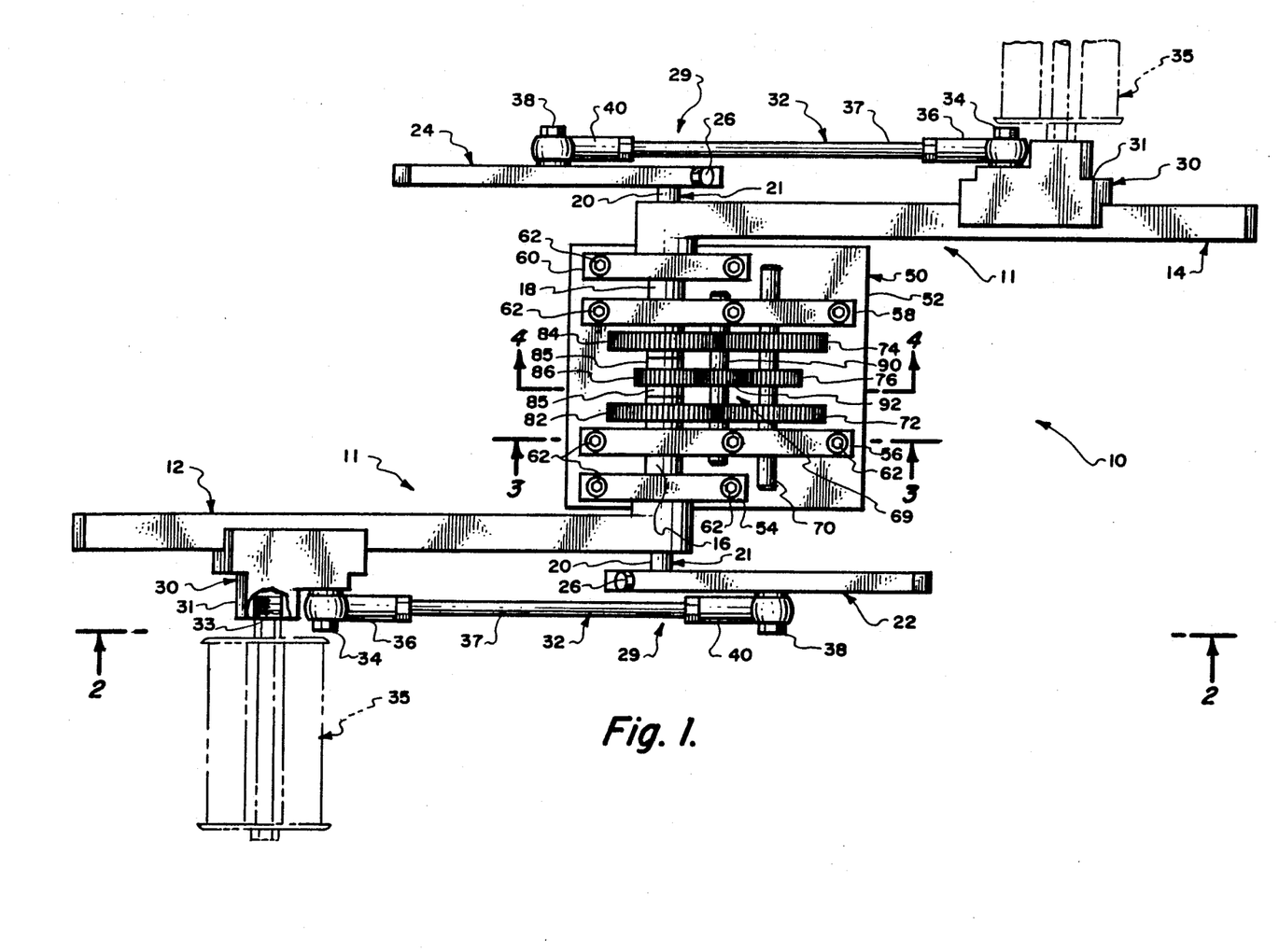
FIG. 1 is a plan view of a crank mechanism constructed in accordance with the teachings of the invention.
Figure 2:
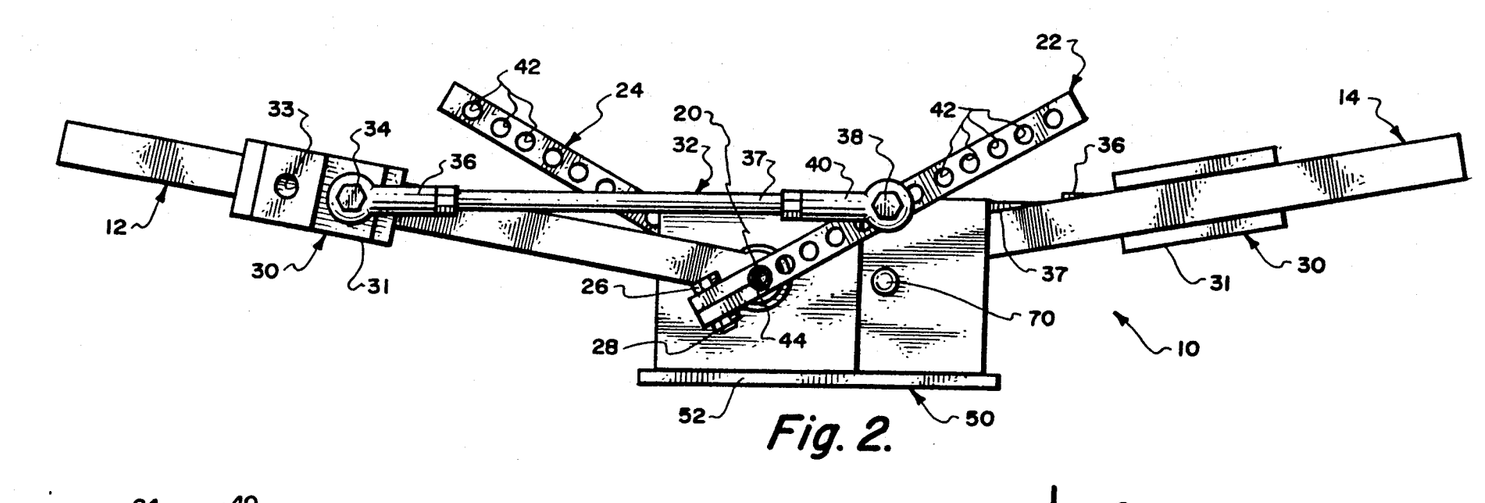
FIG. 2 is an elevational view taken from the broken line 2—2 of FIG. 1.
Figure 3:
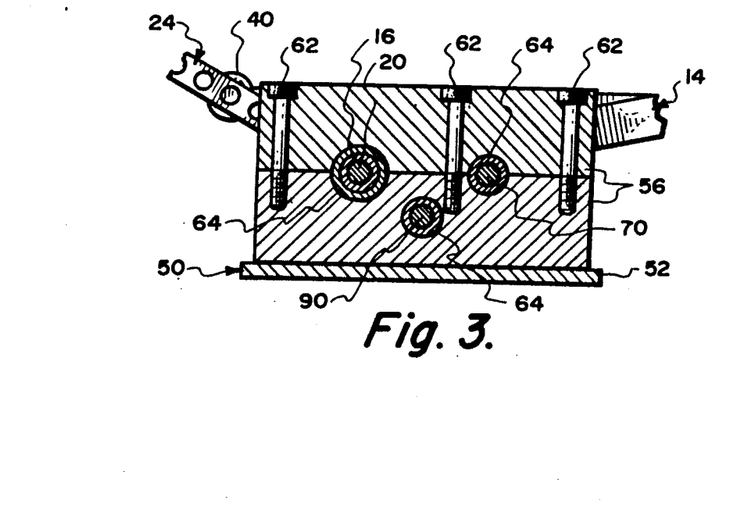
FIG. 3 is a cross-sectional view taken on the broken line 3—3 of FIG. 1.
Figure 4:
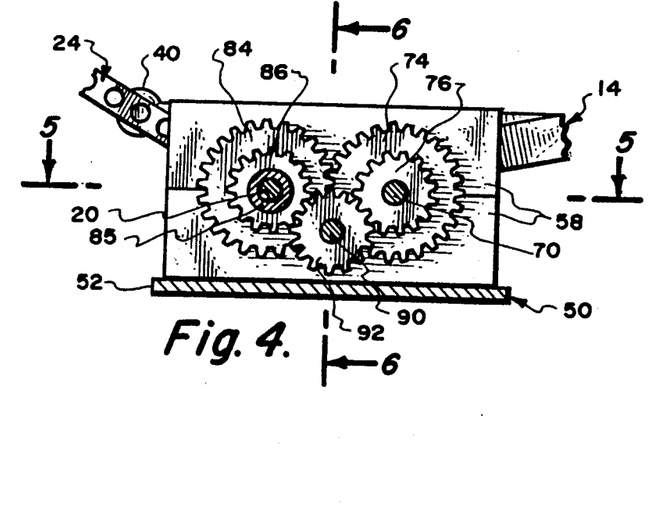
FIG. 4 is an elevational view taken from the broken line 4—4 of FIG. 1.

Referring to the drawings, and particularly to FIGS. 1-3 thereof, we show a crank mechanism 10 which is mounted in support means 50, shown as a base member including a base 52 with main support blocks 56 and 58 and auxiliary support blocks 54 and 60 mounted thereon. The support blocks 54, 56, 58, and 60 are each formed from upper and lower halves, FIG. 3, which halves are held in fixed relationship to each other by countersunk Allen-head bolts 62, for ease in assembling and retaining the various moving components of the invention as discussed herein. Those skilled in the art will appreciate that support means 50 may be constructed in any of a great variety of arrangements, and still be within the teachings and scope of the invention. For example, and not by way of limitation, when the invention is incorporated into a bicycle, the support means could be constituted by a portion of the frame of the bicycle.

For physical therapy applications, the support member 50 can be removably or permanently mounted in various locations and at various orientations according to the patient's needs, to achieve the desirable results discussed herein. Any such mounting must be accomplished in a manner that allows the various arms and components of the invention to freely rotate during the use of the invention, as discussed below.

Rotational motion of the crank mechanism 10 involves, among other things, a first driven member 21 constituted in the preferred embodiment by a first or main shaft 20. The aforesaid rotational motion of the invention further involves a second driven member 11 constituted in the preferred embodiment by rotating arm means shown as a first rotating arm 12 and a second rotating arm 14 and two sleeve members 16 and 18 to which the arms 12 and 14 are respectively attached.

The sleeve members 16 and 18 are coaxially and rotatably mounted on opposing halves of the main shaft 20, although alternative embodiments would include the first and second driven members 21 and 11 in other than the aforedescribed coaxial, sleeve-and-shaft relationship. The sleeve members 16 and 18 and consequently the main shaft 20 are rotatably supported at various points along their respective lengths by support blocks 54, 56, 58, and 60 through ball bearing assemblies 64, FIG. 3. The aforementioned support block halves and bolts 62 enable the assembly of the various shafts and sleeves of the invention.

Figure 16:
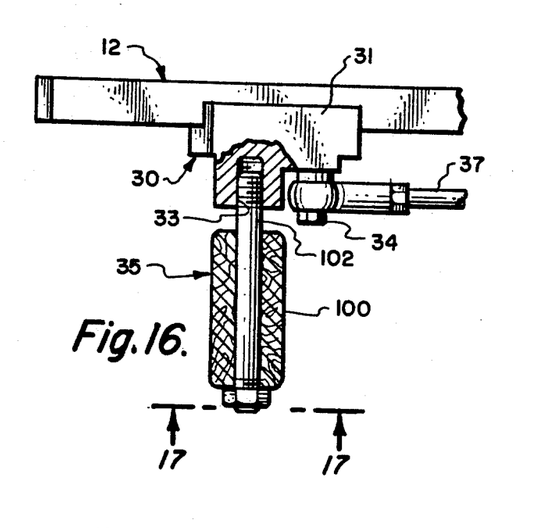
FIG. 16 is a partial plan view of a section of an embodiment of the invention illustrating incorporation of handle means, similar to the lower left quadrant of FIG. 1.
Figure 17:
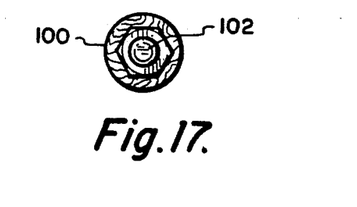
FIG. 17 is an end view taken along the broken line 17—17 of FIG. 16.

Each rotating arm 12 or 14 attached respectively to the sleeve 16 or 18, is provided with attachment means 30, shown as an attachment block 31 mounted with standard linear ball-bearings in tracks (not shown) along the length of the rotating arm so as to be slidable along the length of the respective rotating arm 12 or 14. Each block 31 includes a threaded bore 33, FIG. 2, for receiving a force transmission means 35 such as a pedal or handle attachment (a pedal attachment is shown in phantom in FIG. 1; a handle attachment 100 rotatably mounted on a spindle 102 is illustrated in FIGS. 16 and 17), and further includes a threaded bore (not shown) for receiving a bolt 34 as described below. Thus, the block 31 on arm 12 can be described as being able to receive a first force transmission means 35, and the block 31 on arm 14 can be described as being able to receive a second force transmission means 35.

The aforesaid rotational movement of the crank mechanism 10 also involves first linkage means 29 for transmitting motion between the first driven member 21 and attachment means 30. In the preferred embodiment of the invention, first linkage means 29 includes the threaded bore and its associated bolt 34, and additional members as described below.

Figure 5:
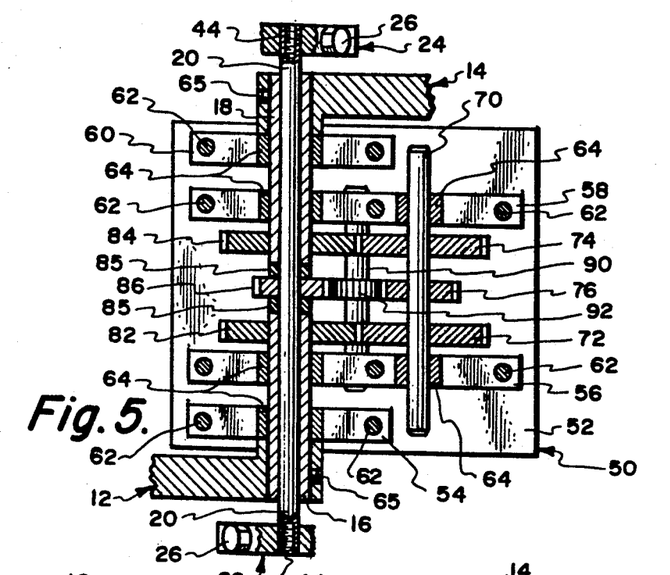
FIG. 5 is a partially cross-sectional plan view taken from the broken line 5—5 of FIG. 4.

The respective ends of the main shaft 20 extend outwardly from the sleeves 16 and 18, and are respectively releasably attached to two counter-rotating arms 22 and 24 through the use of nut and bolt combinations 26 and 28 or a similar expedient. For increased versatility of application as further explained below, the arms 12 and 14 attached to the sleeve members 16 and 18 may also be releasably attached to their respective sleeve members through the utilization of set screws and threaded set screw holes 65, FIG. 5, or a similar expedient.

Each counter-rotating arm 22 or 24 attached to the main shaft 20 is provided with a plurality of threaded holes 42 along its length. Additionally, a centered threaded bore 44 is provided coaxially into each end of the main shaft 20, and the counter-rotating arms 22 and 24 are attached to the main shaft 20 in such a manner to permit access to the respective centered threaded bores 44. In the preferred embodiment, the threaded holes 42 and the threaded bores 44 are adapted to interchangeably receive bolts 38, as more thoroughly discussed below.

In the preferred embodiment of the invention, in addition to being slidable along the length of its respective rotating arm 12 or 14, each attachment block 31 is also connected to its corresponding counter-rotating arm 22 or 24 by an adjustable connecting arm 32. The connecting arms 32 each include ball-bearing assemblies 36 and 40 threadedly engaged with opposite ends of a rod 37, to provide rotatable attachment of the connecting arms at those ends, as will now be more thoroughly described.

The connecting arms 32 are operably engaged with their respective attachment blocks 31 by bolts 34, FIG. 2, which are rotatably received through their respective ballbearing assemblies 36 and removably attached to their respective attachment blocks 31 at the aforementioned threaded bore therein (not shown). Similarly, the opposite ends of the connecting arms 32 are operably engaged with their respective counter-rotating arms 22 and 24 by bolts 38 which are rotatably received through their respective ballbearing assemblies 40 and removably attached to their respective counter-rotating arms 22 or 24 at one of the threaded holes 42 in arms 22 and 24 or at the centered threaded bores 44.

As will be evident from the following explanation, connecting the bolts 38 and their corresponding ends of the connecting arms 32 to any of the threaded holes 42 along the length of the counter-rotating arms 22 or 24 will result in a particular elliptical path for the pedals or handles 35. Similar connection to the centered threaded bores 44 will result in a circular path for the pedals or handles during rotation of the crank mechanism. In addition, the radius of such paths can be adjusted by increasing or decreasing the effective length of the connecting arms 32, through rotation of the rod 37 with respect to the ball-bearing assemblies 36 and 40, or replacement of the rod with one of a different length.

The first linkage means of the preferred embodiment thus includes the connecting arms 32 and the counter-rotating arms 22 and 24, with their respective components and bolt assemblies. In an alternative embodiment of the invention, not shown, the linkage means provides a range of selectable elliptical paths that is infinite, rather than being relatively limited by the incremental locations of the threaded holes 42. In such an alternative embodiment, the counter-rotating arms 22 and 24 are each provided with a member slidable along their length, similar to the attachment block 31 on the rotating arm 12 or 14. This slidable member may be temporarily fixed at any selected location along the length of the counter-rotating arm 22, through the use of a frictionally gripping bolt or similar expedient. The connecting arm 32 is operably engaged with this counter-rotating slidable member, achieving a linkage similar to that of the preferred embodiment.

Figure 18:
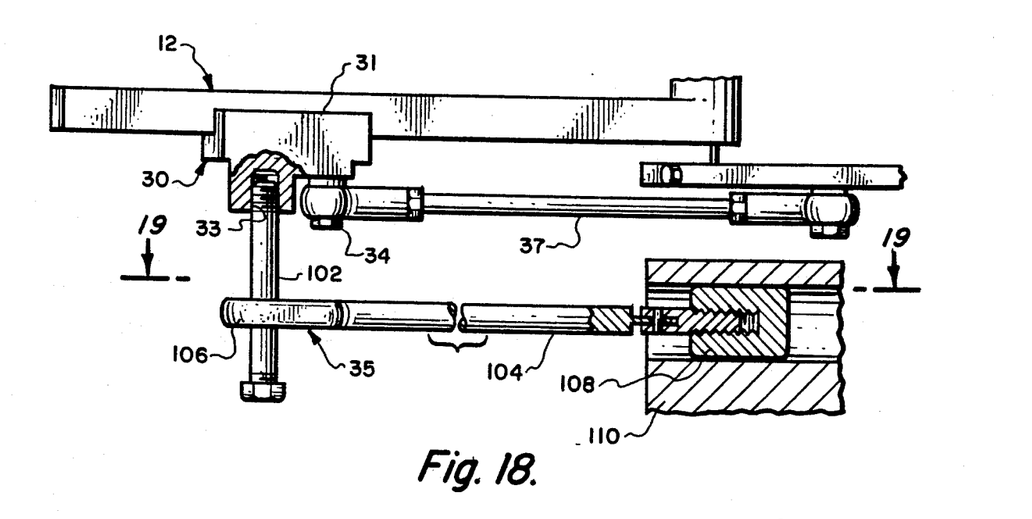
FIG. 18 is a partial plan view similar to FIG. 16 but illustrating incorporation of rod and piston means.
Figure 19:
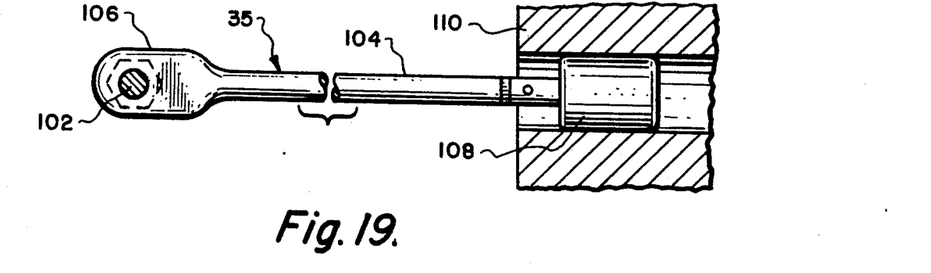
FIG. 19 is a partially cross-sectional view taken along the broken line 19—19 of FIG. 18.

As indicated above, a threaded attachment hole 33, FIG. 2, is provided in each attachment block 31. The hole 33 is adapted to receive various force transmission means 35 such as bicycle-type pedals (shown in phantom in FIG. 1). In physical therapy treatment of a patient's arms or hands, handles or pegs may be used as the force transmission members 35. If the crank mechanism of the invention is adapted for use in an engine (such as partially illustrated in FIGS. 18-19), the force transmission members 35 may include piston rods 104 rotatably attached at one end 106 to attachment means 30 at the holes 33. In such case, the piston rods 104 may be attached at their opposite ends to pistons 108 whose cylinders 110 are preferably fixed in relation to support means 50 of the crank mechanism 10. The linkage between the piston and the crank mechanism 10 would thus be similar to that between the piston and the drive wheels of a steam locomotive.

The rotational movement of the crank mechanism 10 further includes second linkage means 69 to transmit movement between the first driven means 21 and the second driven means 11. In the preferred embodiment, second linkage means comprises a system of interconnecting gears and additional shafts, FIGS. 1 and 4-6, used to cause, maintain, and control the relative rotations of the various arms 12, 14, 22, and 24, and correspondingly the movements of the connecting arms 32, attachment means 30, and force transmission means 35 engaged therewith.

Specifically, a second shaft 70, FIGS. 3-5 and FIGS. 8 and 9, is supported by ball bearing assemblies 64 in the base member 50, and is in a parallel and spaced relationship with respect to the first shaft 20 and the sleeve members 16 and 18 associated therewith. The second shaft 70 is provided with gears 72 and 74 adapted to mesh with gears 82 and 84 respectively fixed to the sleeve members 16 and 18.

Figure 6:
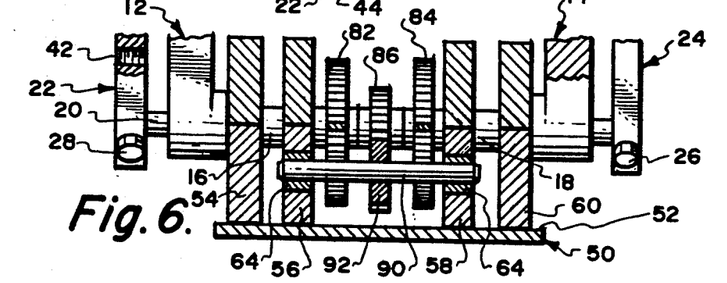
FIG. 6 is a cross-sectional view taken on the broken line 6—6 of FIG. 4.

A third shaft 90, FIG. 6, is also supported by ball bearing assemblies 64 in the base member 50 and is also in parallel, spaced relationship with the first and second shafts 20 and 70. In addition to the gears 72 and 74, the second shaft 70 has a gear 76 fixed thereto, FIG. 4, and the first shaft 20 has a gear 86 fixed thereto and disposed between the sleeve members 16 and 18. Friction between the gear 86 and the sleeve members 16 and 18 is reduced by spacer members 85 disposed on the first shaft 20 between the gear and the sleeve members. A gear 92 is fixed to the third shaft 90 in operable relationship with the gears 76 and 86 to transmit rotation from the second shaft 70 to the first shaft 20 and vice versa.

The gearing and shaft arrangement just described results in the first shaft 20 and the second shaft 70 rotating in the same direction during operation of the crank mechanism 10, while the third shaft 90 and the sleeve members 16 and 18 rotate in the opposite direction.

Operation of the invention in an elliptical pattern can be illustrated with reference to FIGS. 1-6. This discussion will describe rotating arm 12 as moving in a clockwise direction (when looking at FIG. 2) with the patient or bicyclist supplying the motive force to one pedal or handle to operate the crank mechanism. Those skilled in the art will understand, however, that the principles of the invention can be practiced with efficacy with the rotating arm 12 moving in a counter-clockwise direction, with the motive force being applied to both rotating arms 12 and 14, and/or with an external motive force such as a motor rotating the mechanism, as more thoroughly discussed below.

The patient or bicyclist applies a motive force in the clockwise direction through force transmission means 35 attached at the threaded hole 33 in the attachment block 31. Consequently, the assembly of the rotating arm 12, its sleeve 16, and the gear 82 associated therewith rotate in the clockwise direction. The gear 82 meshes with the gear 72, causing gear 72, associated second shaft 70, and gears 74 and 76 affixed thereto to rotate in a counterclockwise direction. Gear 76 in turn meshes with the gear 92 affixed to the third shaft 90 to cause gear 92 and third shaft 90 to rotate in a clockwise direction. Finally, gear 92 causes gear 86, the main shaft 20 to which gear 86 is affixed, and counter-rotating arms 22 and 24 (secured to the first shaft 20) to rotate in a counterclockwise direction.

The net result is that the counter-rotating arms 22 and 24 rotate in the opposite direction as the rotating arms 12. If connecting arms 32 are attached to counter-rotating arms 22 and 24 at any point (such as at the point at which it is attached in FIG. 2) other than central bore 44, the aforedescribed rotation will cause the attachment blocks 31 to slide along the length of the rotating arm 12 or 14 during such rotation, resulting in the aforementioned elliptical path of force transmission means 35. As indicated above, the invention can be adjusted so that force transmission means 35 describes a circular path by attaching the connecting arm 32 at the central hole 44. In such case, the attachment block 31 on the rotating arm 12 would remain stationary with respect to the arm 12, resulting in the aforesaid circular path.

Thus, the invention allows the force transmission member 35 to selectively describe an elliptical or circular path as the various arms of the invention are rotated. As just described, if the bolt 38 is engaged in the central threaded hole 44, the force transmission member 35 will describe a circular motion. This motion becomes elliptical as the bolt 38 is selectively engaged in other of the threaded holes 42 outwardly along the length of the counter-rotating arm 22, with the maximum ellipticity of the motion occurring when the bolt 38 is engaged in the outermost threaded hole 42. In addition, and as described earlier, the radius of any such motion can be adjusted by rotating the rod 37 with respect to the ball-bearing assemblies 36 and 40, or replacing the rod with one of a different length.

Figure 10:
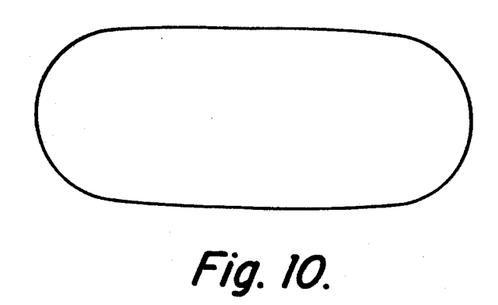
FIGS. 10 and 11 are representations of some of the elliptical paths achievable with the invention.
Figure 11:
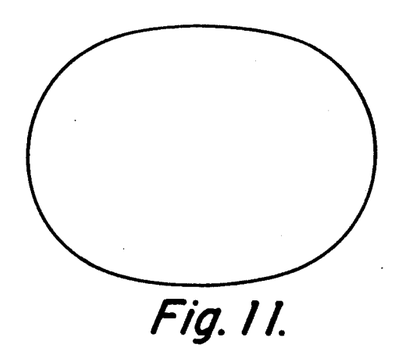

Rough outlines of some of the elliptical paths achievable with the invention are shown in FIGS. 10 and 11.

As previously noted, it will be obvious to those skilled in the art that the invention can be practiced with one rotating arm 12 and associated counter-rotating arm 22 and connecting arm 32, and in such case, the gears 74 and 84 are superfluous, not being necessary for such practice.

As also indicated above, the various shafts 20, 70, and 90 are held in parallel alignment by support means 50 constituted in the preferred embodiment by the combination of a base plate 52 and shaft alignment plates 54, 56, 58 and 60 in bolted assembly around the crank mechanism. Those skilled in the art will realize, however, that the outermost shaft alignment plates 54 and 60 are intended to reduce the cantilever effect on the ends of the first shaft 20. According to the dimensions and materials used to construct the crank mechanism, as well as the loads imposed thereon, these outermost plates 54 and 60 may not be necessary for practice of the invention.

The positions of various arm components of the invention may be adjusted with respect to each other, as discussed above, thereby permitting a physical therapist to customize the treatment for a particular patient. For example, the nut and bolt combinations 26 and 28 of the counter-rotating arms 22 and 24 and the set screws attaching rotating arms 12 and 14 allow a physical therapist to orient the various arms of the invention in a variety of configurations.

As an example of such a configuration, and not by way of limitation as to the range of such configurations, the invention can be used to simulate a rowing motion. To achieve this motion, the arms 12 and 14, and 22 and 24 can respectively be aligned in phase with each other, FIG. 9, and the connecting rods 32 affixed to the outermost threaded hole 42 of the counter-rotating arms 22 and 24 so as to cause a relatively flat elliptical path. Furthermore, for treatments where only one of the patient's limbs needs to receive treatment, the invention can be used with only one rotating arm 12 or 14 and its corresponding counter-rotating arm 22 or 24. Additionally, the crank mechanism of the invention can be adjusted so that force transmission means 35 on opposite sides of the crank mechanism simultaneously describe paths which differ from each other.

Disengagement of the aforementioned gears from one another provides an additional method for a physical therapist to customize the treatment for a particular patient. The various gears may be removably affixed to their respective shafts 20, 70, and 90 by countersunk set screws (not shown), permitting the aforesaid disengagement.

Figure 8:
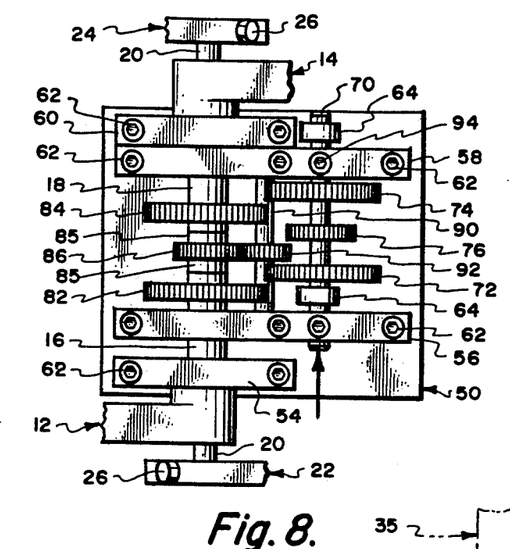
FIG. 8 is a plan view of the central portion of a partially disassembled embodiment of the invention, similar to the view of FIG. 7.

Alternatively, set screws 94, FIG. 8, similar to bolts 62, may be provided in alignment plates 54 and/or 56, to facilitate disengagement of the various gears on the second shaft 70 from the corresponding gears on the sleeves 16 and 18 and on the third shaft 90. This disengagement is accomplished by loosening the set screws 94 and sliding the second shaft 70 and its associated gears and ball bearings in the direction indicated by the arrow in FIG. 8. For purposes of illustrating this disengagement, the support blocks 58 and 60 are shown more in a more closely spaced relationship in FIG. 8 than in the other drawings.

While the gears are so disengaged, the counter-rotating arms 22 and 24, and correspondingly the connecting arms 32 and the mounting means 30, may be repositioned with respect to the rest of the crank mechanism, enabling a therapist to customize the crank mechanism's use for the patient to be treated, as indicated above.

Those skilled in the art will recognize that the invention can achieve a virtually infinite combination of degrees of ellipticity and relative positions of the rotating arms 12 and 14 with respect to each other, providing a tremendously versatile tool to physical therapists, and providing to bicyclists a desirable alternative to pedalling mechanisms presently available.

Figure 7:
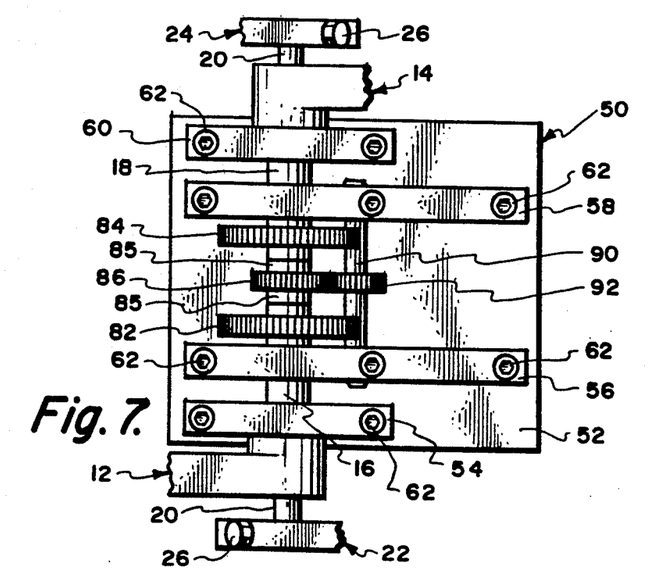
FIG. 7 is a plan view of the central portion of an alternative embodiment of the invention.

FIG. 7 illustrates the invention with the second shaft 70 removed, as discussed above. In this configuration, and with the connecting arms 32 affixed to the centermost threaded bore 44, the pedals or handles 35 can be moved in a circular pattern.

Figure 9:
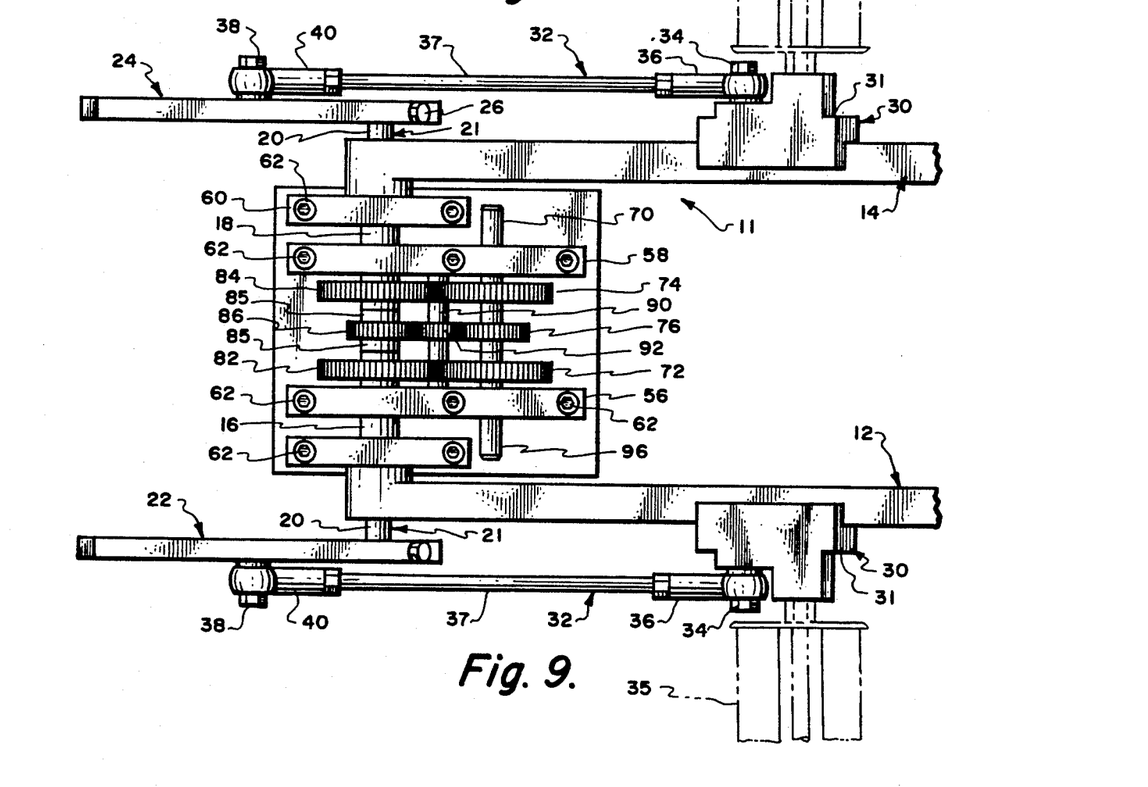
FIG. 9 is a plan view of the invention adjusted to provide an elliptical motion for the pedals, with the pedals in phase with each other.

Finally, as indicated above, a sprocket (not shown) may be affixed to the rotating arms 12 or 14, the first shaft 20, or the second shaft 70, such as near an end 96 thereof, FIG. 9, and power drive means such as a chain-drive mechanism (not shown) from an external source such as a motor may be attached to said sprocket to provide power input to drive the crank mechanism. Alternatively, such power input could be accomplished without such a chain-drive and sprocket mechanism by applying the external motive force to any of the gears already mounted on the shafts 20, 70, or 90 or the sleeves 16 or 18. Such power input allows a therapist to treat a severely disabled patient by placing the patient's hands or feet on the crank handles or pedals 35 and allowing the motor to pull the patient's limbs through the desired motion. Such power input would, of course, also allow a bicycle to be driven by an external (non-rider) power source.

The structure just described for applying a positive motive force to the crank mechanism is also easily adapted to provide additional drag and resistance to the patient's movements for patients receiving more advanced treatments, or for exercising on stationary bicycles and the like. In such applications, a flywheel or other expedient can be attached in place of the motor to increase the amount of resistance normally present in the crank mechanism.

The adjustability of the invention gives a therapist a tool with tremendous flexibility of treatments. As a patient becomes stronger, the power input can be reduced and/or the resistance can be increased, according to the desired course of treatment. The degree of ellipticity of the pedal or handle pattern may likewise be gradually adjusted over the course of treatment of a patient. As the patient's limb becomes accustomed to a particular path of movement, the ellipticity can be incrementally changed, resulting in the eventual achievement of the natural range of motion of the limb.

As indicated above, the invention is easily adapted for use in a bicycle pedalling mechanism by mounting a traditional chain-drive sprocket (not shown) onto the shafts 20, 70, or 90, the sleeves 16 or 18, the rotating arms 12 or 14, or otherwise so that the rotational motion of the crank mechanism may be transmitted to a wheel of the bicycle.

Among the advantages of the invention are that energy from a patient, a bicyclist, or an engine may be utilized more efficiently to rotate the crank mechanism, as illustrated in FIGS. 12-15. With respect to bicyclists and/or patients, human limbs can exert force more readily in certain directions than in others. For example, the legs can provide greater force in extending the feet (constituted in the conventional bicycling position by moving the feet in an approximately vertical direction) than in pushing the feet forward (moving the feet in an approximately horizontal direction).

Figure 12:
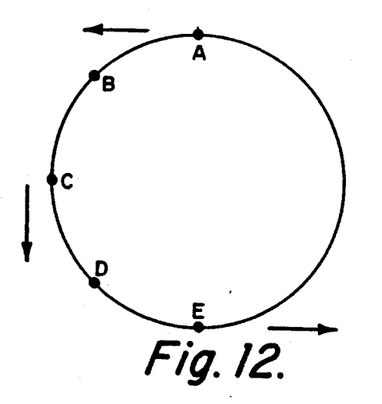
FIGS. 12 through 15 are schematic illustrations of some of the efficiency advantages of the invention.
Figure 13:
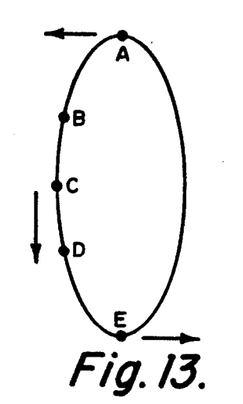
Figure 14:
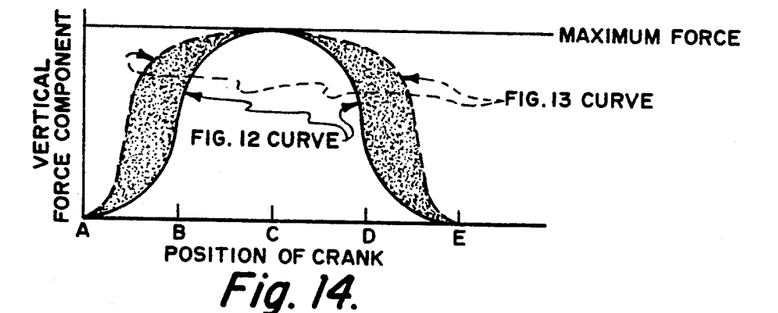
Figure 15:
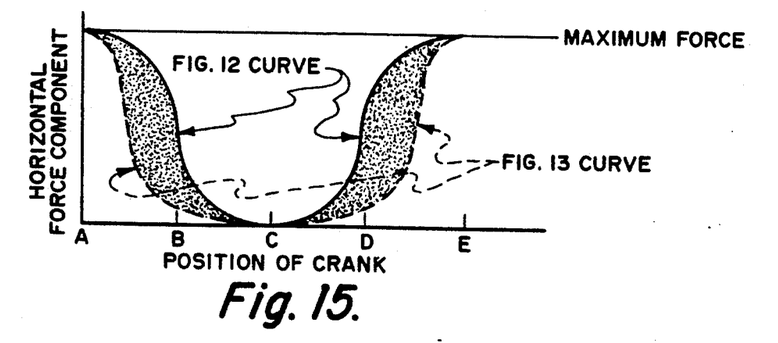

As is well known, however, traditional bicycle crank mechanisms yield a circular pedal path, FIG. 12. The crank mechanism of the invention, in contrast, can be adjusted to approach elliptical paths similar to FIG. 13, along with a broad spectrum of other paths of varying degrees of ellipticity. As illustrated in FIGS. 14-15, the elliptical bicycle pedal path of FIG. 13 provides significant benefits over the traditional circular path of FIG. 12. The elliptical path more nearly utilizes the maximum vertical force (the strongest direction for the legs) throughout the cyclic motion, FIG. 14. Correspondingly, the elliptical path more nearly requires the minimum horizontal force (the weakest direction for the legs) throughout the cyclic motion, FIG. 15.

For example, when the crank mechanism is turned to the position indicated by the letter B on FIGS. 12-15, which is approximately 45 degrees past top center (represented by the letter A on FIGS. 12-15), it is clear that the elliptical path of FIG. 13 involves a nearly vertical application of force by the bicyclist's leg. By way of comparison, at position B in the circular path of FIG. 12, a substantial horizontal force must still be applied by the bicyclist.

The result is that the muscles of the legs are more efficiently utilized in the elliptical paths achievable with the crank mechanism of the invention. Similar considerations and results apply for other muscles and for other uses of the invention, even for uses in crankshafts and camshafts in engines.

The crank mechanism of the invention has been described with some particularity but the specific designs and constructions disclosed are not to be taken as delimiting of the invention in that various obvious modifications will at once make themselves apparent to those of ordinary skill in the art, all of which will not depart from the essence of the invention and all such changes and modifications are intended to be encompassed within the appendant claims.

We claim:

1. In a crank mechanism, the combination of: support means; a first driven member and a second driven member operably retained in said support means; attachment means associated with said second driven member; first linkage means operatively linking said attachment means and said first driven member; and second linkage means operatively linking said first driven member and said second driven member, whereby as said first driven member is rotated, said attachment means described a repetitive curvilinear path, in which said first driven member includes a first shaft and said second driven member includes a sleeve member disposed about said first shaft, whereby said first shaft and said sleeve member can rotate relatively of each other, in which said second driven member further includes rotating arm means operably connected to said sleeve member whereby said attachment means is slidable along said rotating arm means.

2. The mechanism of claim 1 in which said crank mechanism is adapted to interact with a power drive means.

3. The mechanism of claim 1 in which said support means constitutes a portion of a bicycle frame.

4. The mechanism of claim 1 in which said support means constitutes a base member permitting said mechanism to be located, positioned, and utilized in physical therapy.

5. The mechanism of claim 1, further including force transmission means associated with said attachment means.

6. The mechanism of claim 5 in which said force transmission means constitutes pedal means associated with said attachment means.

7. The mechanism of claim 5 in which said force transmission means constitutes handle means associated with said attachment means.

8. The mechanism of claim 5 in which said force transmission means constitutes piston and rod means operably attached to said attachment means.

9. The mechanism of claim 1 or claim 2 or claim 3 or claim 4 or claim 5 or claim 6 or claim 7 or claim 8 in which said attachment means constitutes a plurality of attachment members selectably rotatable either in phase with each other or out of phase with each other when said mechanism is operated.

10. The mechanism of claim 9 in which said first linkage means includes a counter-rotating arm operably connected to said first driven member.

11. The mechanism of claim 10 in which said first linkage means further includes a connecting arm between said attachment means and said counter-rotating arm.

12. The mechanism of claim 10 in which said second linkage means includes a second shaft and a third shaft and gears operably associated with said first and second driven members and said second and third shafts, whereby rotation of said first driven member in one direction causes rotation of said second driven member in the opposite direction.

13. The mechanism of claim 1 or claim 2 or claim 3 or claim 4 or claim 5 or claim 6 or claim 7 or claim 8 in which said first linkage means is adjustable whereby said attachment means can selectively describe a repetitive curvilinear path.

14. In a device for exercise such as physical therapy, bicycling, or the like, the combination of: a first shaft rotatably disposed in a sleeve member; a rotating arm operably connected to said sleeve member; force transmission means slidable along said rotating arm; first linkage means operatively linking said force transmission means and said first shaft; second linkage means structurally separate from said first linkage means and operatively linking said first shaft and said sleeve member; and support means for retaining in operable relationship said first linkage means, said second linkage means, said sleeve member, and said force transmission means, whereby said force transmission means describes a repetitive curvilinear path when said device is operated.

15. The device of claim 14 which is adapted to interact with power drive means.

16. The device of claim 14, in which said force transmission means constitutes handle means for interaction with a patient's hands or feet.

17. The device of claim 14 or claim 15 or claim 16 or claim 21 in which said first linkage means is adjustable whereby said force transmission means can selectively describe a repetitive curvilinear path.

18. The device of claim 17 in which said first linkage means includes a counter-rotating arm operably connected to said first shaft.

19. The device of claim 18 in which said first linkage means further includes a connecting arm between said force transmission means and said counter-rotating arm.

20. The device of claim 18 in which said second linkage means includes a second shaft and a third shaft with gears operably associated with said sleeve member, said first shaft, said second shaft, and said third shaft, whereby rotation of said rotating arm in one direction causes rotation of said counter-rotating arm in the opposite direction.

21. The device of claim 14, in which said force transmission means constitutes pedal means for interaction with a patient's hands or feet.

22. The device of claim 14 or claim 15 or claim 16 or claim 21, in which said sleeve member is divided transversely of a longitudinal axis of said sleeve member into a first sleeve member portion and a second sleeve member portion, and said rotating arm constitutes a first rotating arm operably connected to said first sleeve member portion and a second rotating arm is operably connected to said second sleeve member portion, further including second force transmission means slidable along said second rotating arm.

23. The device of claim 22, further including third linkage means operatively linking said second force transmission means and said first shaft, whereby said first rotating arm and said second rotating arm are selectably rotatable either in phase with each other or out of phase with each other when said device is operated.

24. The device of claim 22, further including adjustable third linkage means operatively linking said second force transmission means and said first shaft, whereby said force transmission means on said first rotating arm and said second force transmission means on said second rotating arm may selectively describe repetitive adjustable curvilinear paths which are independent in shape from each other.

25. In a device for exercise such as physical therapy, bicycling, or the like, the combination of: a first shaft rotatably disposed in a sleeve member; a rotating arm operably connected to said sleeve member; force transmission means slidable along said rotating arm; first linkage means operatively linking said force transmission means and said first shaft; second linkage means operatively linking said first shaft and said sleeve member; and support mans for retaining in operable relationship said first linkage means, said second linkage means, said sleeve member, and said force transmission means, whereby said force transmission means describes a repetitive curvilinear path when said device is operated, in which said sleeve member is divided transversely of a longitudinal axis of said sleeve member into a first sleeve member portion and a second sleeve member portion, and said rotating arm constitutes a first rotating arm operably connected to said first sleeve member portion and a second rotating arm is operably connected to said second sleeve member portion, further including second force transmission means slidable along said second rotating arm.

26. The device of claim 25, further including adjustable third linkage means operatively linking said second force transmission means and said first shaft, whereby said first rotating arm and said second rotating arm are selectably rotatable either in phase with each other or out of phase with each other when said device is operated.

* * * * *